(12) United States Patent
Ejima

(10) Patent No.: US 8,896,944 B2
(45) Date of Patent: Nov. 25, 2014

(54) LENS BARREL

(71) Applicant: Panasonic Corporation, Osaka (JP)

(72) Inventor: Rikiya Ejima, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/187,487

(22) Filed: Feb. 24, 2014

(65) Prior Publication Data

US 2014/0168798 A1 Jun. 19, 2014

Related U.S. Application Data

(63) Continuation of application No. PCT/JP2012/002846, filed on Apr. 25, 2012.

(30) Foreign Application Priority Data

Aug. 25, 2011 (JP) .................................. 2011-184109

(51) Int. Cl.
*G02B 7/02* (2006.01)

(52) U.S. Cl.
USPC ............................ 359/822; 359/813; 359/819

(58) Field of Classification Search
USPC .................. 359/694–704, 811–830
See application file for complete search history.

(56) References Cited

U.S. PATENT DOCUMENTS

| | | | |
|---|---|---|---|
| 7,969,665 B2 * | 6/2011 | Tseng | 359/813 |
| 2003/0202262 A1 | 10/2003 | Sasaki et al. | |
| 2007/0195430 A1 | 8/2007 | Koyama | |
| 2009/0251803 A1 * | 10/2009 | Tseng | 359/822 |

FOREIGN PATENT DOCUMENTS

| | | |
|---|---|---|
| JP | 11-271587 | 10/1999 |
| JP | 2001-305408 | 10/2001 |
| JP | 2003-295025 | 10/2003 |
| JP | 2006-091153 | 4/2006 |
| JP | 2010-066720 | 3/2010 |
| JP | 2010-256567 | 11/2010 |

OTHER PUBLICATIONS

International Search Report for corresponding International Application No. PCT/JP2012/002846 mailed Jul. 13, 2012.
Form PCT/ISA/237 for corresponding International Application No. PCT/JP2012/002846 dated Jul. 13, 2012.

* cited by examiner

*Primary Examiner* — Mohammed Hasan
(74) *Attorney, Agent, or Firm* — Renner, Otto, Boisselle & Sklar, LLP

(57) ABSTRACT

A lens barrel includes: a lens frame including at least one lens; a lens adjusting frame to which the lens frame is attached; and a fixed frame to which the lens adjusting frame is attached. The lens adjusting frame is attached to the fixed frame such that a position or a tilt angle of the lens adjusting frame is adjustable. The lens frame is attached to the lens adjusting frame such that the lens frame is detachable from the lens adjusting frame.

6 Claims, 14 Drawing Sheets

LENS BARREL

CROSS-REFERENCE TO RELATED APPLICATIONS

This is a continuation of International Application No. PCT/JP2012/002846 filed on Apr. 25, 2012, which claims priority to Japanese Patent Application No. 2011-184109 filed on Aug. 25, 2011. The entire disclosures of these applications are incorporated by reference herein.

BACKGROUND

The technique disclosed herein relates to lens barrels.

In recent years, imaging apparatus generating image data of subjects has become widespread rapidly. This imaging apparatus is equipped with a lens barrel for adjusting a focal length. Examples of the imaging apparatus include integrated lens cameras and cameras with interchangeable lenses. An integrated lens camera incorporates a lens barrel. A camera with interchangeable lenses includes a camera body and a lens barrel detachably attached to the camera body.

In such a lens barrel, the position of a lens is adjusted in order to obtain desired optical performance. For example, Japanese Unexamined Patent Publication No. H11-271587 describes a lens barrel that performs eccentric adjustment of a lens as such a positional adjustment.

SUMMARY

In the lens barrel of Japanese Unexamined Patent Publication No. H11-271587, once a lens barrel is disassembled for maintenance such as dust removal after a positional adjustment of a lens, a positional adjustment of the lens needs to be performed again when the lens barrel is reassembled.

It is therefore an object of the technique disclosed herein to maintain the position or tilt angle of a lens while a lens barrel is disassembled/assembled after an adjustment of the position or tilt angle of the lens.

The technique disclosed herein is directed to a lens barrel including: a lens frame including at least one lens; a lens adjusting frame to which the lens frame is attached; and a fixed frame to which the lens adjusting frame is attached, wherein the lens adjusting frame is attached to the fixed frame such that a position or a tilt angle of the lens adjusting frame is adjustable, and the lens frame is attached to the lens adjusting frame such that the lens frame is detachable from the lens adjusting frame.

In the lens barrel, the position or tilt angle of a lens can be maintained while a lens barrel is disassembled/assembled by detachment/attachment of a lens frame after an adjustment of the position or tilt angle of the lens.

DETAILED DESCRIPTION

Embodiments are described in detail below with reference to the attached drawings. However, unnecessarily detailed description may be omitted. For example, detailed description of well known techniques or description of the substantially same elements may be omitted. Such omission is intended to prevent the following description from being unnecessarily redundant and to help those skilled in the art easily understand it.

Inventor provides the following description and the attached drawings to enable those skilled in the art to fully understand the present disclosure. Thus, the description and the drawings are not intended to limit the scope of the subject matter defined in the claims.

An example embodiment will be described in detail hereinafter with reference to the drawings.

1. Appearance of Imaging Apparatus and Lens Barrel

Figure 1:
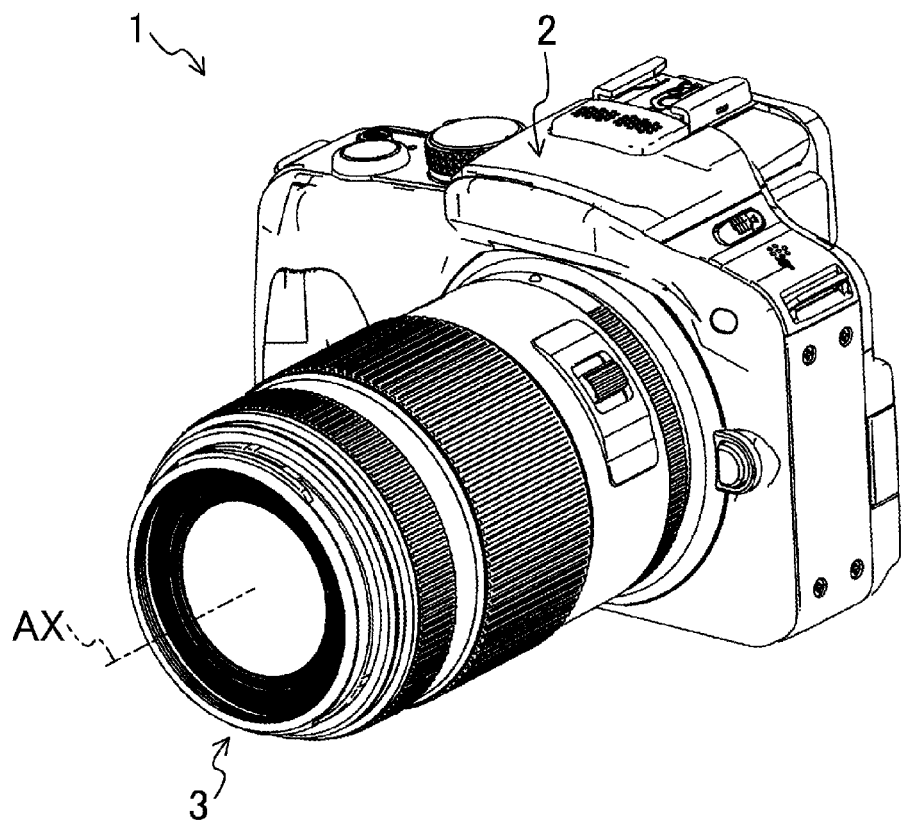
FIG. 1 is a perspective view of an imaging apparatus according to an embodiment.

FIG. 1 is a perspective view of an imaging apparatus 1. The imaging apparatus 1 is a digital camera with interchangeable lenses. The imaging apparatus 1 includes a camera body 2 and a lens barrel 3 detachably attached to the camera body 2. In this embodiment, a subject side in an optical axis direction of the lens barrel 3 will be referred to as a "front," and a camera body side in the optical axis direction of the lens barrel 3 will be referred to as a "rear," for convenience of explanation. Unless otherwise specified, a "circumferential direction" refers to a circumferential direction about an optical axis and "radially" refers to a radial direction going inward and outward from the optical axis.

Figure 2:
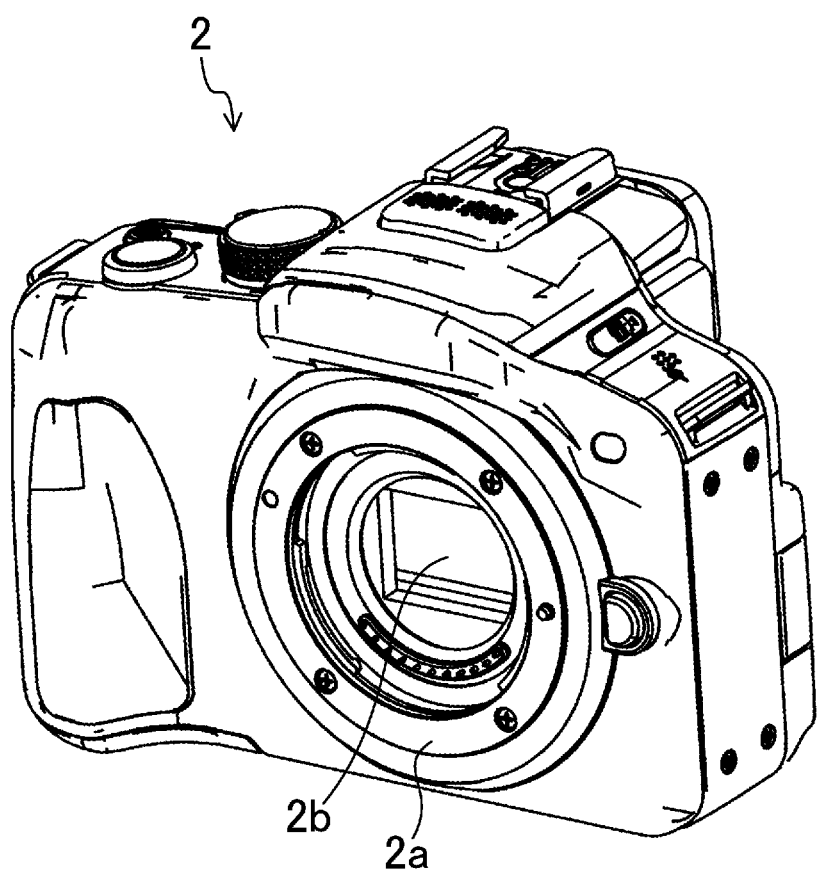
FIG. 2 is a perspective view of a camera body from which a lens barrel is detached.

FIG. 2 is a perspective view of the camera body 2 from which the lens barrel 3 is detached. The camera body 2 includes a body mount 2a to which the lens barrel 3 is attached, and an imaging device 2b that converts an optical image formed in the lens barrel 3 into image data.

Figure 3:
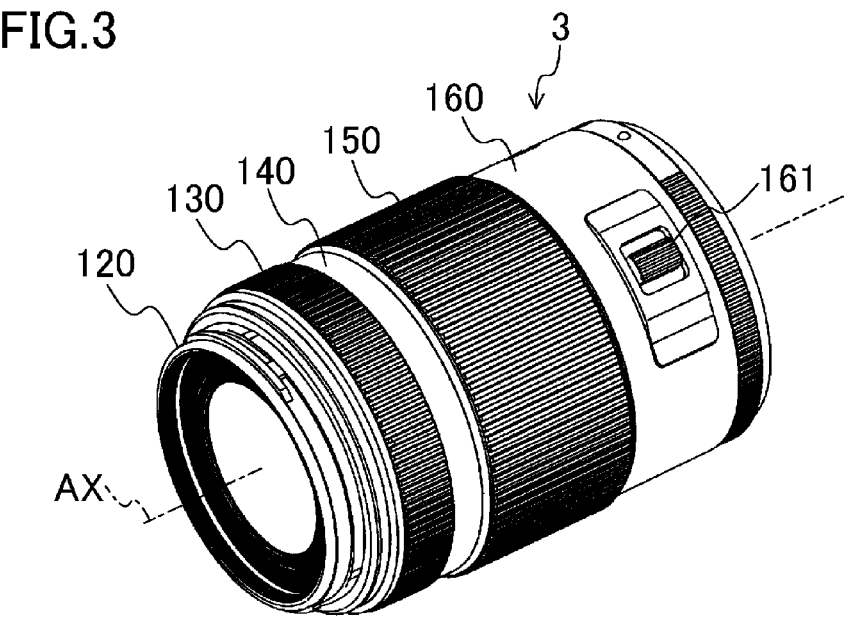
FIG. 3 is a perspective view of the lens barrel when viewed obliquely from the front.
Figure 4:
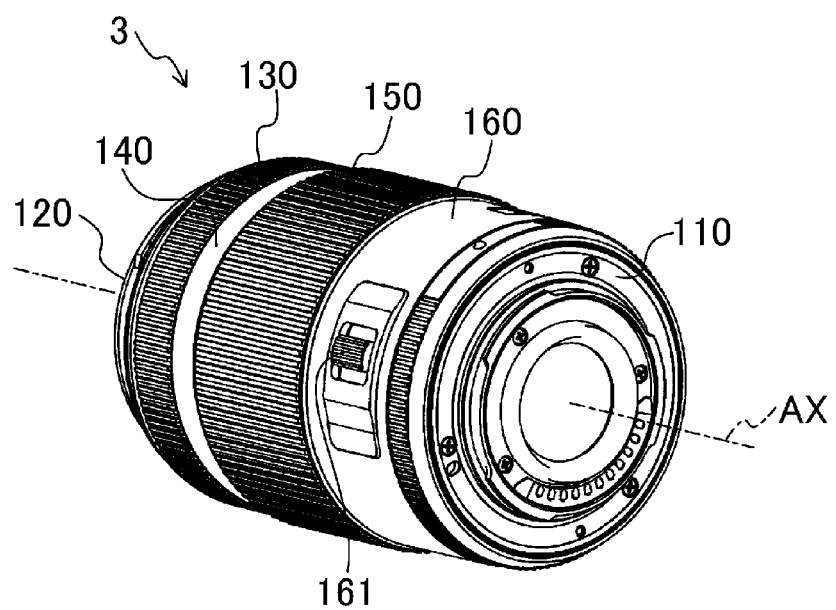
FIG. 4 is a perspective view of the lens barrel when viewed obliquely from the rear.

FIG. 3 is a perspective view illustrating the lens barrel 3 when viewed obliquely from the front. FIG. 4 is a perspective view of the lens barrel 3 when viewed obliquely from the rear. The lens barrel 3 includes a lens mount 110 at a rear end thereof, which will be described in detail below. The lens barrel 3 is mechanically and electrically coupled to the camera body 2 through the lens mount 110 and the body mount 2a. The lens barrel 3 is a zoom lens with a fixed overall length.

2-1. Configuration of Lens Barrel

Figure 5:
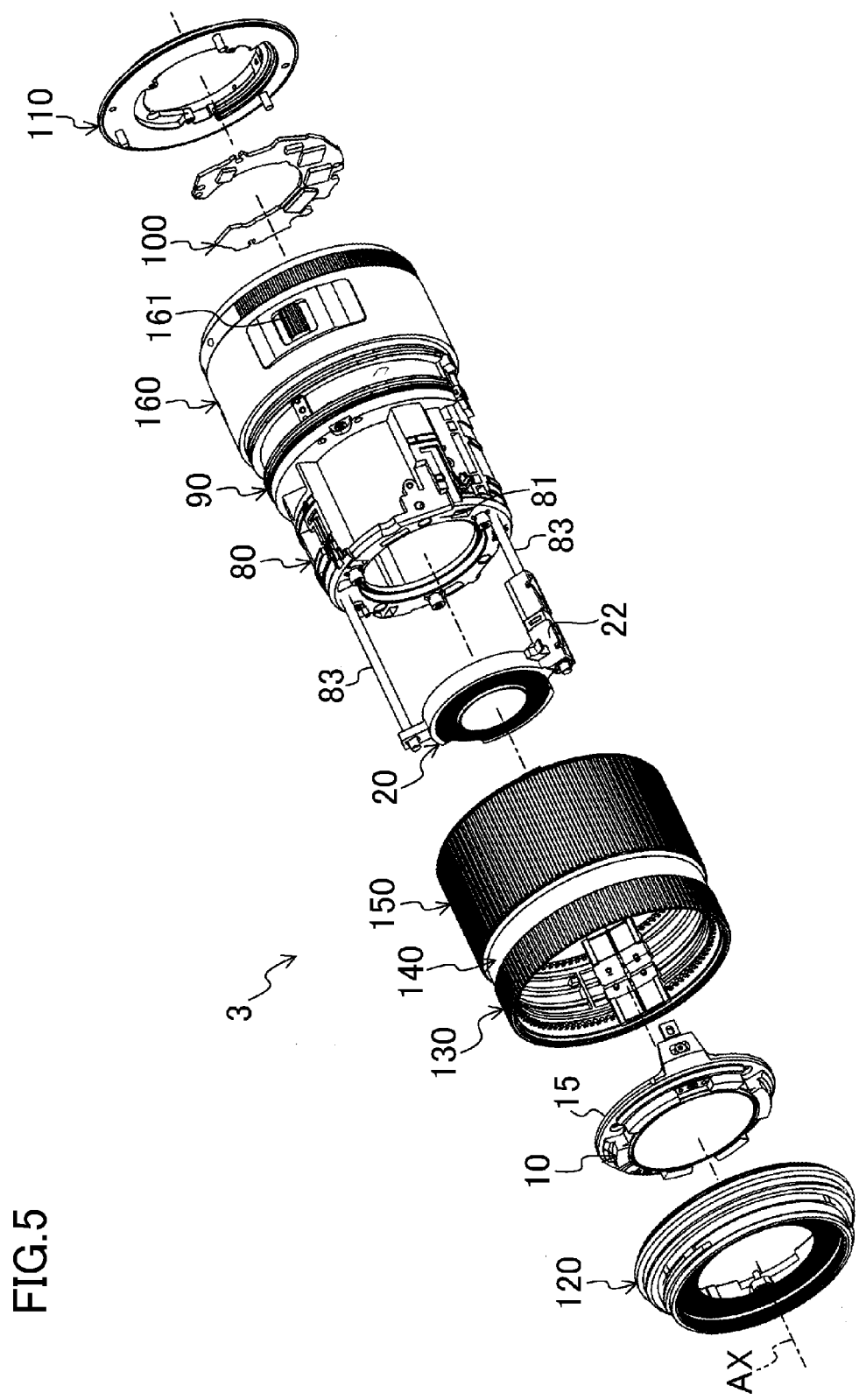
FIG. 5 is a disassembled perspective view of the lens barrel.
Figure 6:
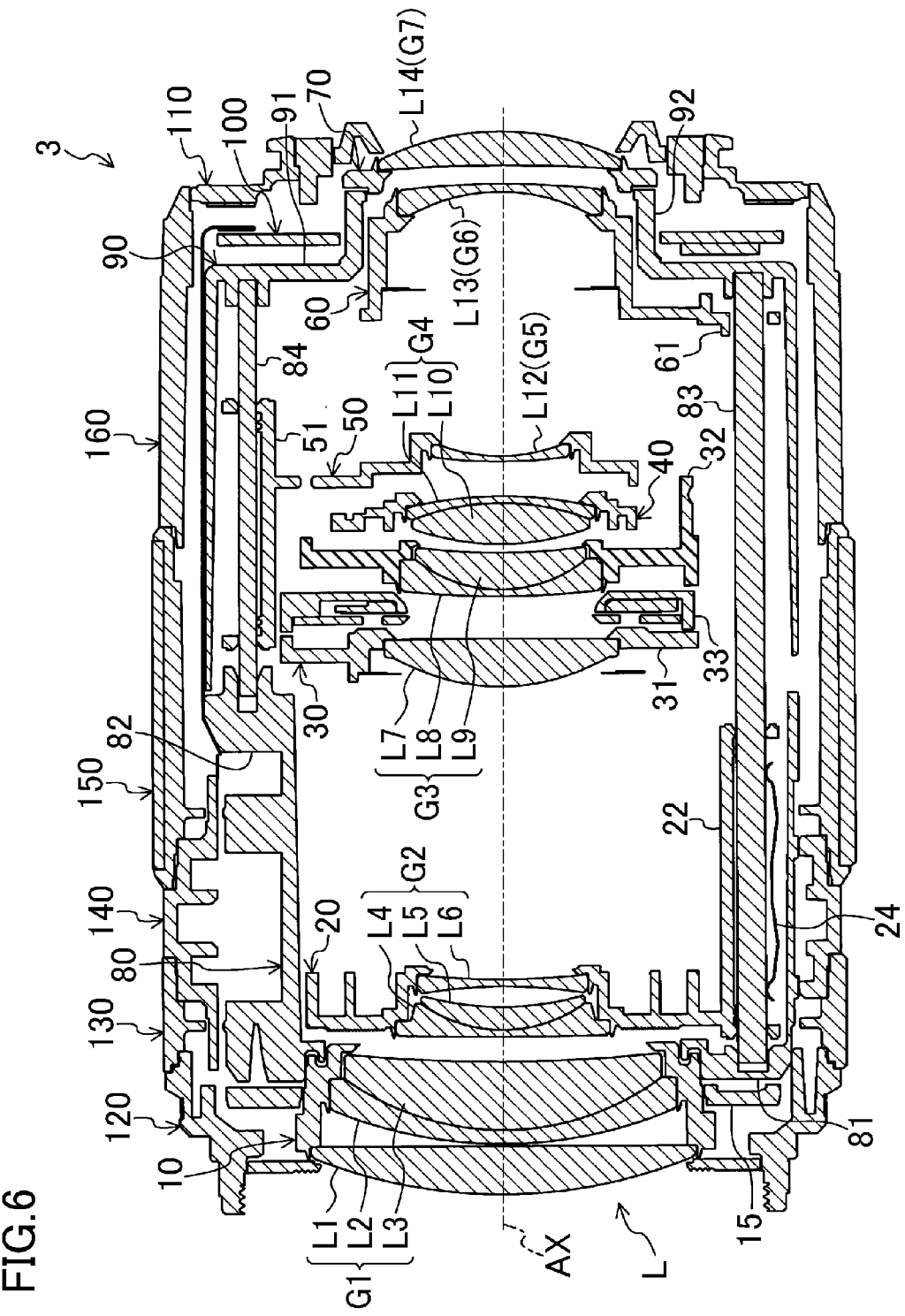
FIG. 6 is a cross-sectional view of the lens barrel at a wide angle end.
Figure 7:
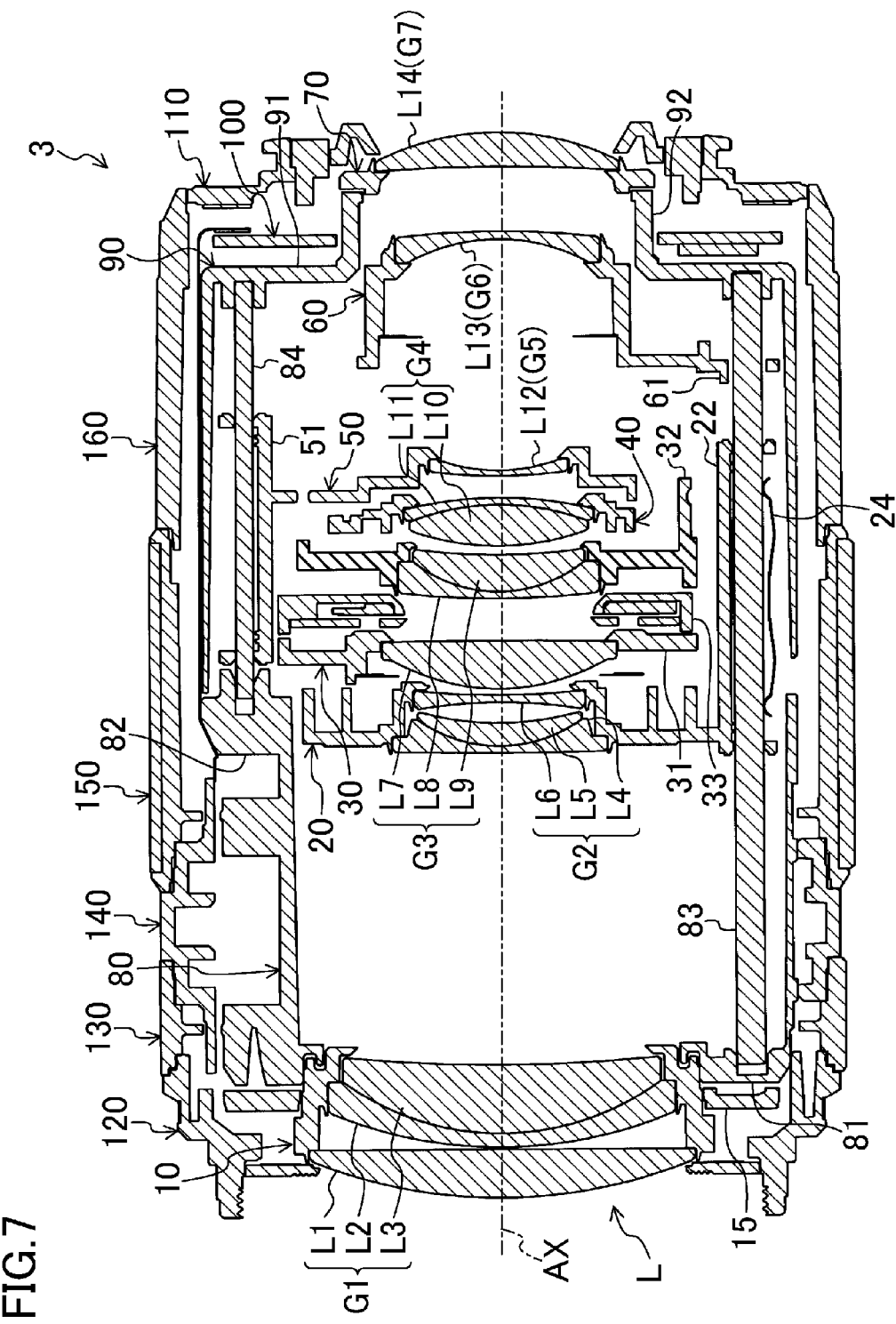
FIG. 7 is a cross-sectional view of the lens barrel at a telephoto end.

FIG. 5 is a disassembled perspective view of the lens barrel 3. FIG. 6 is a cross-sectional view of the lens barrel 3 at a wide angle end. FIG. 7 is a cross-sectional view of the lens barrel 3 at a telephoto end. The lens barrel 3 includes an optical system L composed of a plurality of lenses, first through seventh lens group frames 10-70 holding the lenses, front and rear fixed frames 80 and 90 supporting and housing the first through seventh lens group frames 10-70, a printed circuit board 100, a lens mount 110, a filter ring 120, a focus ring 130, an intermediate ring 140, a zooming ring 150, and a cylindrical outer frame 160.

Specifically, the optical system L is a zoom lens system for forming an optical image of a subject, and is constituted by first through seventh lens groups G1-G7. The first lens group G1 is constituted by first through third lenses L1-L3. The second lens group G2 is constituted by fourth through sixth lenses L4-L6. The second lens group G2 is a zoom lens. The third lens group G3 is constituted by seventh through ninth lenses L7-L9. The fourth lens group G4 is constituted by tenth and eleventh lenses L10 and L11. The fourth lens group G4 is a lens for correcting an image blur. The fifth lens group G5 is constituted by a twelfth lens L12. The sixth lens group G6 is constituted by a thirteenth lens L13. The fifth and sixth lens groups G5 and G6 are focus lenses. The seventh lens group G7 is constituted by a fourteenth lens L14. The first lens L1 is the first lens closest to the subject among the lenses L1-L14.

The front fixed frame 80 is a cylindrical member. An annular front wall 81 having an opening at the center thereof is provided at a front end of the front fixed frame 80. A flange 82 radially projecting outward is provided at a rear end of the front fixed frame 80. The front fixed frame 80 is provided with a zoom motor 23 (see FIGS. 13-15) that drives the second lens group frame 20, which will be described later.

The rear fixed frame 90 is a cylindrical member. An annular rear wall 91 having an opening at the center thereof is provided at a rear end of the rear fixed frame 90. A cylindrical portion 92 extending rearward is provided at an opening edge of the rear wall 91. The rear fixed frame 90 is provided with a first focus motor 52 (see FIGS. 13-15) that drives a fifth lens group frame 50, which will be described later, and a second focus motor (not shown) that drives the sixth lens group frame 60, which will be described later.

The front fixed frame 80 and the rear fixed frame 90 are coupled together and forms an integrated cylinder. In the front fixed frame 80 and the rear fixed frame 90, two first shafts 83 extending along the optical axis and two second shafts 84 extending along the optical axis are provided. The first shafts 83 are supported by the front wall 81 of the front fixed frame 80 and the rear wall 91 of the rear fixed frame 90. The second shafts 84 are supported by the flange 82 of the front fixed frame 80 and the rear wall 91 of the rear fixed frame 90. The front fixed frame 80 and the rear fixed frame 90 support the first lens group frame 10 at the front end thereof, support the seventh lens group frame 70 at the rear end thereof, and house the second through sixth lens group frames 20-60 therein. FIG. 5 illustrates a state in which the second lens group frame 20 is exposed to the front from the front fixed frame 80, for convenience of explanation.

The first lens group frame 10 is an annular member having an opening at the center thereof, and holds the first lens group G1 in the opening. The first lens group frame 10 is attached to the front surface of the front wall 81 of the front fixed frame 80 through an adjusting base 15 (a lens adjusting frame). The adjusting base 15 is a member for adjusting a tilt angle of the first lens group G1 relative to an optical axis AX. The adjusting base 15 is attached to the front fixed frame 80 such that the tilt angle to the optical axis AX can be adjusted.

The second lens group frame 20 is an annular member having an opening at the center thereof, and holds the second lens group G2 in the opening. The second lens group frame 20 is supported on the first shafts 83 through a bearing 22 such that the second lens group frame 20 is movable along the optical axis. The second lens group frame 20 is driven by the zoom motor 23 provided in the front fixed frame 80, and moves along the optical axis.

The third lens group frame 30 includes a front frame 31 that is an annular member having an opening at the center thereof and holds the seventh lens L7 in the opening and a rear frame 32 that is an annular member having an opening at the center thereof and holds the eighth and ninth lenses L8 and L9 in the opening. A diaphragm mechanism 33 is provided between the front frame 31 and the rear frame 32. The third lens group frame 30 is fixed to a front portion of the rear fixed frame 90.

The fourth lens group frame 40 is an annular member having an opening at the center thereof, and holds the fourth lens group G4 in the opening. The fourth lens group frame 40 is supported on the rear frame 32 of the third lens group frame 30 such that the fourth lens group frame 40 is movable on a plane orthogonal to the optical axis AX. The fourth lens group frame 40 is provided with two magnets (not shown). On the other hand, the rear frame 32 is provided with two coils (not shown). The fourth lens group frame 40 is driven by a magnetic force generated by the coils of the rear frame 32, and moves on the plane orthogonal to the optical axis AX.

The fifth lens group frame 50 is an annular member having an opening at the center thereof, and holds the fifth lens group G5 in the opening. The fifth lens group frame 50 is supported on the second shafts 84 through a bearing 51 such that the fifth lens group frame 50 is movable along the optical axis. The fifth lens group frame 50 is driven by the first focus motor 52 provided in the rear fixed frame 90, and moves along the optical axis.

The sixth lens group frame 60 is an annular member having an opening at the center thereof, and holds the sixth lens group G6 in the opening. The sixth lens group frame 60 is supported on the first shafts 83 through a bearing 61 such that the sixth lens group frame 60 is movable along the optical axis. The sixth lens group frame 60 is driven by the second focus motor provided in the rear fixed frame 90, and moves along the optical axis.

The seventh lens group frame 70 is an annular member having an opening at the center thereof, and holds the seventh lens group G7 in the opening. The seventh lens group frame 70 is attached to a rear end surface of the cylindrical portion 92 of the rear fixed frame 90.

In this manner, the first lens group frame 10, the third lens group frame 30, and the seventh lens group frame 70 are fixed and supported on the front fixed frame 80 or the rear fixed frame 90. The second lens group frame 20, the fifth lens group frame 50, and the sixth lens group frame 60 are supported on the front fixed frame 80 or the rear fixed frame 90 such that the second lens group frame 20, the fifth lens group frame 50, and the sixth lens group frame 60 are movable along the optical axis. The fourth lens group frame 40 is supported on the third lens group frame 30 such that the fourth lens group frame 40 is movable on the plane orthogonal to the optical axis AX.

The lens mount 110 is an annular member having an opening at the center thereof, and is attachable to the body mount 2a. The lens mount 110 is attached to the rear wall 91 of the rear fixed frame 90.

The printed circuit board 100 is provided with at least a lens microcomputer (not shown) and a memory. The printed circuit board 100 is connected to components of the lens barrel 3 through a flexible printed circuit board. The printed circuit board 100 is also electrically connected to a mount contact (not shown) provided on the lens mount 110. That is, the printed circuit board 100 is electrically connected to the camera body 2 by attaching the lens barrel 3 to the camera body 2. The printed circuit board 100 is disposed between the rear wall 91 of the rear fixed frame 90 and the lens mount 110.

The filter ring 120, the focus ring 130, the intermediate ring 140, the zooming ring 150, and the outer frame 160 are arranged in this order from the front along the optical axis. These components are external members exposed to the outside.

The filter ring 120 is a member for attaching an optical filter, a conversion lens, a lens hood, for example. The filter ring 120 is attached to the front surface of the front wall 81 of the front fixed frame 80.

The intermediate ring 140 is fitted onto an outer circumference of the front fixed frame 80 and attached to the front fixed frame 80 such that the intermediate ring 140 does not rotate. Photosensors (not shown) for detecting the rotation amounts of the focus ring 130 and the zooming ring 150 are provided on the inner peripheral surface of the intermediate ring 140.

The outer frame 160 is fitted onto the outer circumference of the rear fixed frame 90 and attached to the rear fixed frame 90 such that the outer frame 160 does not rotate. A zoom lever 161 is provided on the outer peripheral surface of the outer frame 160 and is exposed to the outside.

The focus ring 130 is fitted onto the outer circumference of the front fixed frame 80 and supported on the filter ring 120 and the intermediate ring 140 such that the focus ring 130 is rotatable about the optical axis AX.

The zooming ring 150 is fitted onto both the outer circumference of the front fixed frame 80 and the outer circumference of the rear fixed frame 90, and supported on the intermediate ring 140 and the rear fixed frame 90 such that the zooming ring 150 is rotatable about the optical axis AX.

2-2. Operation of Lens Barrel

In the thus-configured lens barrel 3, zoom magnification can be manually adjusted by operating the zooming ring 150 or the zoom lever 161. The focus state can be manually adjusted by operating the focus ring 130.

Specifically, when the zooming ring 150 is rotated, the amount of rotation is detected by the photosensor, and the detection signal is sent to the printed circuit board 100 via the flexible printed circuit board. Similarly, when the zoom lever 161 is operated, a detection signal in accordance with the amount of operation is sent to the printed circuit board 100. In the printed circuit board 100, the lens microcomputer outputs a drive signal in accordance with the detection signal to the zoom motor 23. The zoom motor 23 operates in response to the drive signal, and moves the second lens group frame 20 along the optical axis. In this manner, the zoom magnification is manually adjusted.

At this time, the fifth and sixth lens group frames 50 and 60 are driven in conjunction with the second lens group frame 20. Specifically, based on a previously stored tracking table, the lens microcomputer moves the fifth and sixth lens group frames 50 and 60 to positions at which a focus state can be maintained before and after a change in focal length. That is, in response to the detection signal, the lens microcomputer not only outputs a drive signal to the zoom motor 23 but also outputs a drive signal to the first and second focus motors. Consequently, the fifth and sixth lens group frames 50 and 60 are caused to move to positions in accordance with the position of the second lens group frame 20.

The positions of the fifth and sixth lens group frames 50 and 60 can be manually adjusted by operating the focus ring 130. Specifically, when the focus ring 130 is rotated, the amount of rotation is detected by the photosensor, and the detection signal is sent to the printed circuit board 100 via the flexible printed circuit board. In the printed circuit board 100, the lens microcomputer outputs a drive signal in accordance with the detection signal to the first and second focus motors. The first and second focus motors operate in response to the drive signal, and move the fifth and sixth lens group frames 50 and 60 along the optical axis. In this manner, the focus state is manually adjusted.

Figure 8:
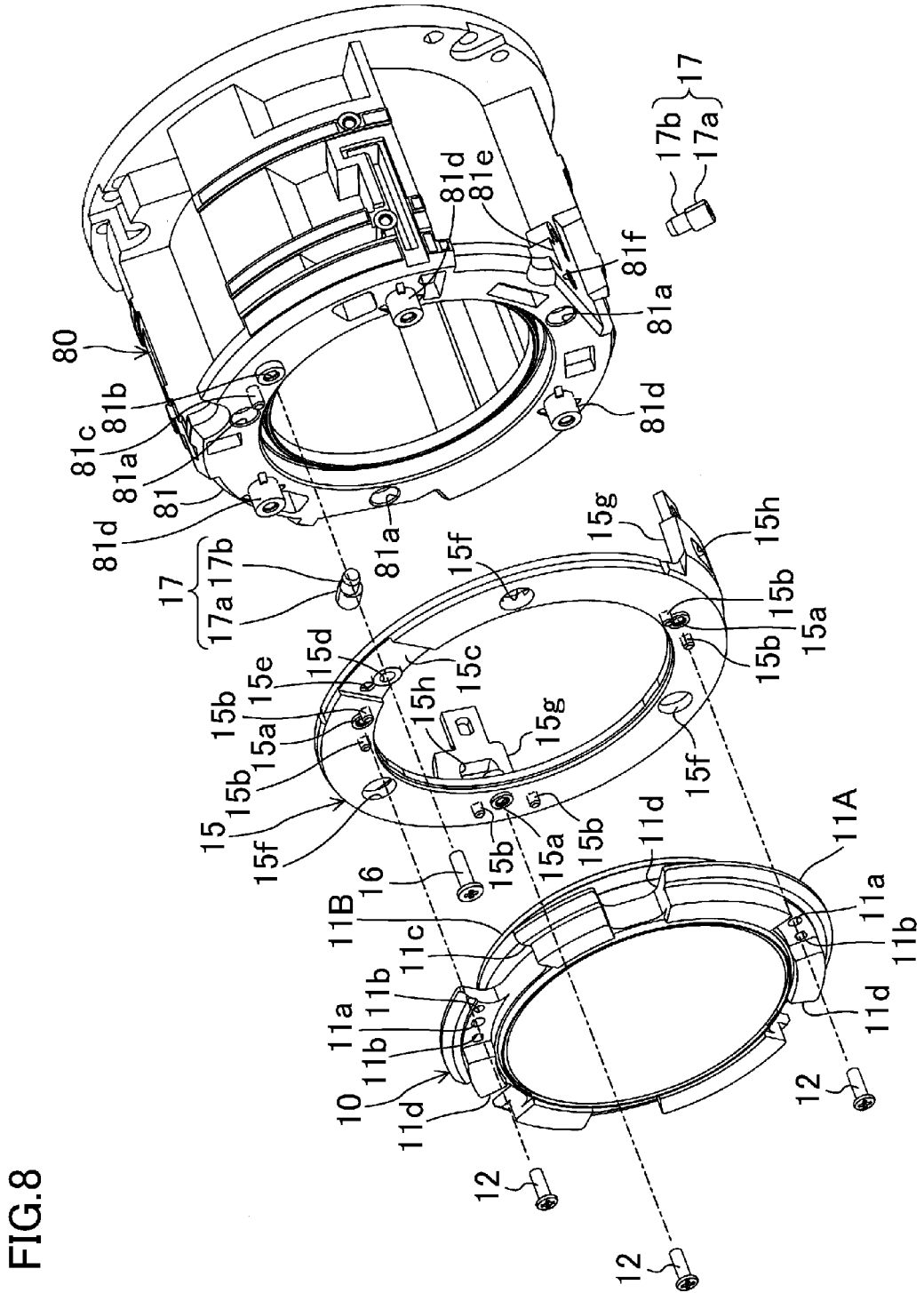
FIG. 8 is a disassembled perspective view of an attachment structure of a first lens group frame to a front fixed frame.
Figure 9:
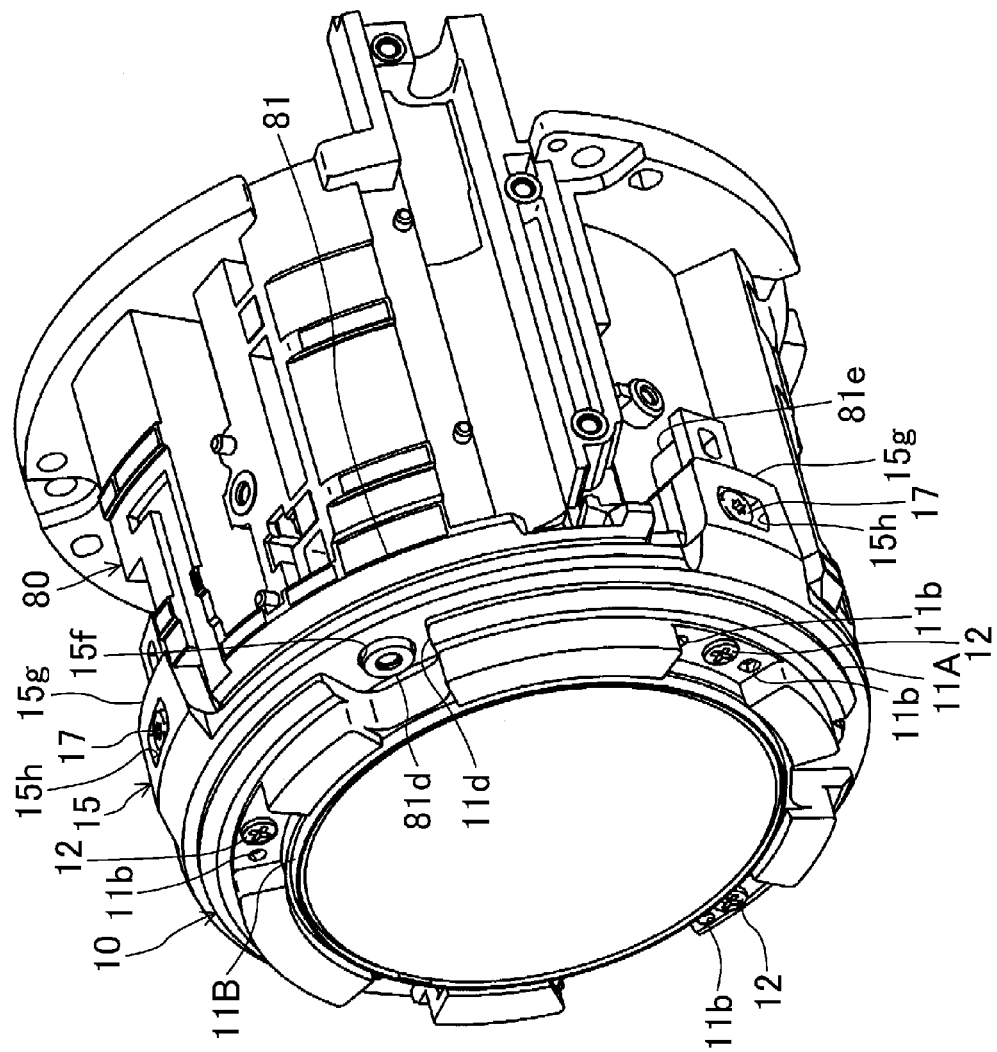
FIG. 9 is a perspective view of the attachment structure of the first lens group frame to the front fixed frame.
Figure 10:
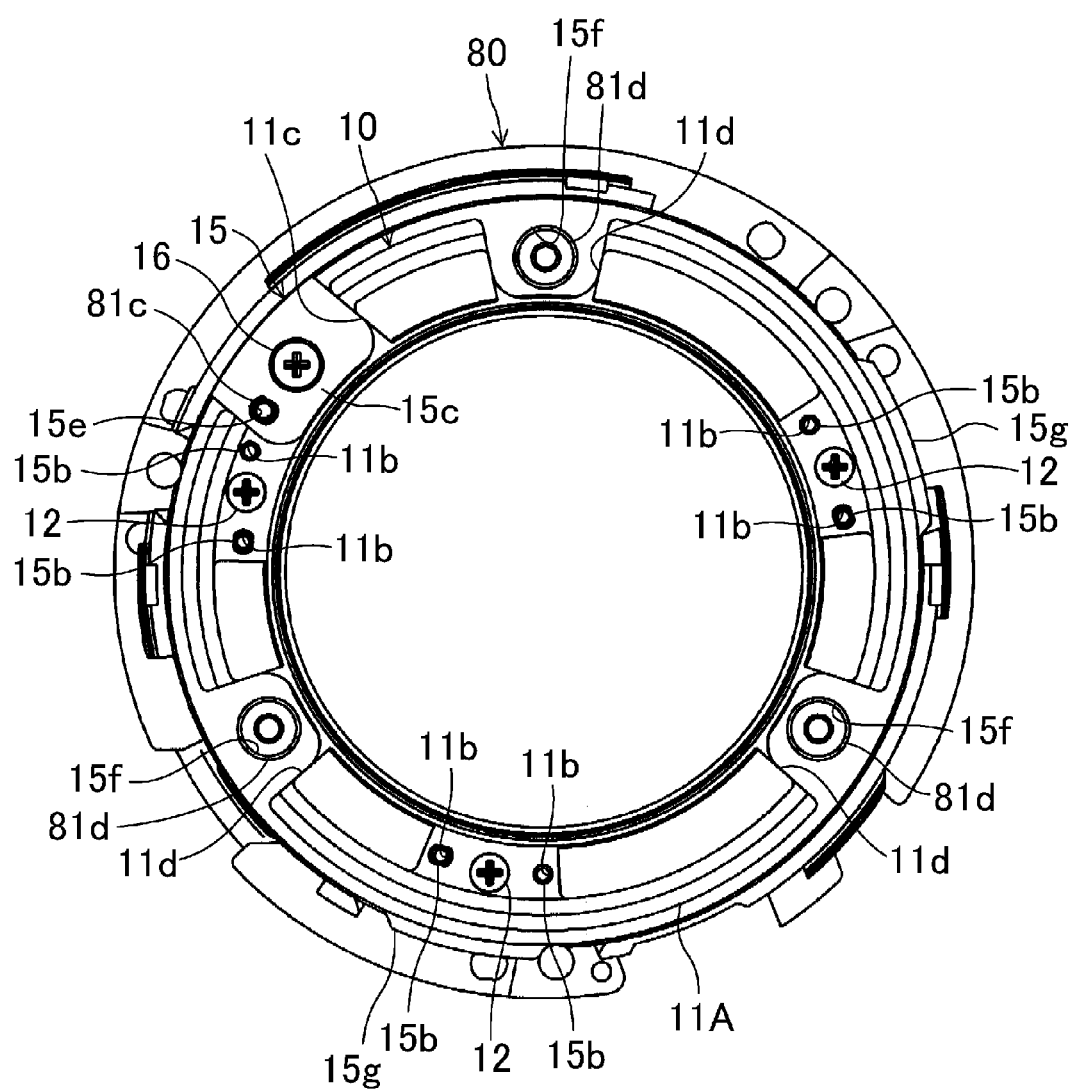
FIG. 10 is a front view of the attachment structure of the first lens group frame to the front fixed frame.
Figure 11:
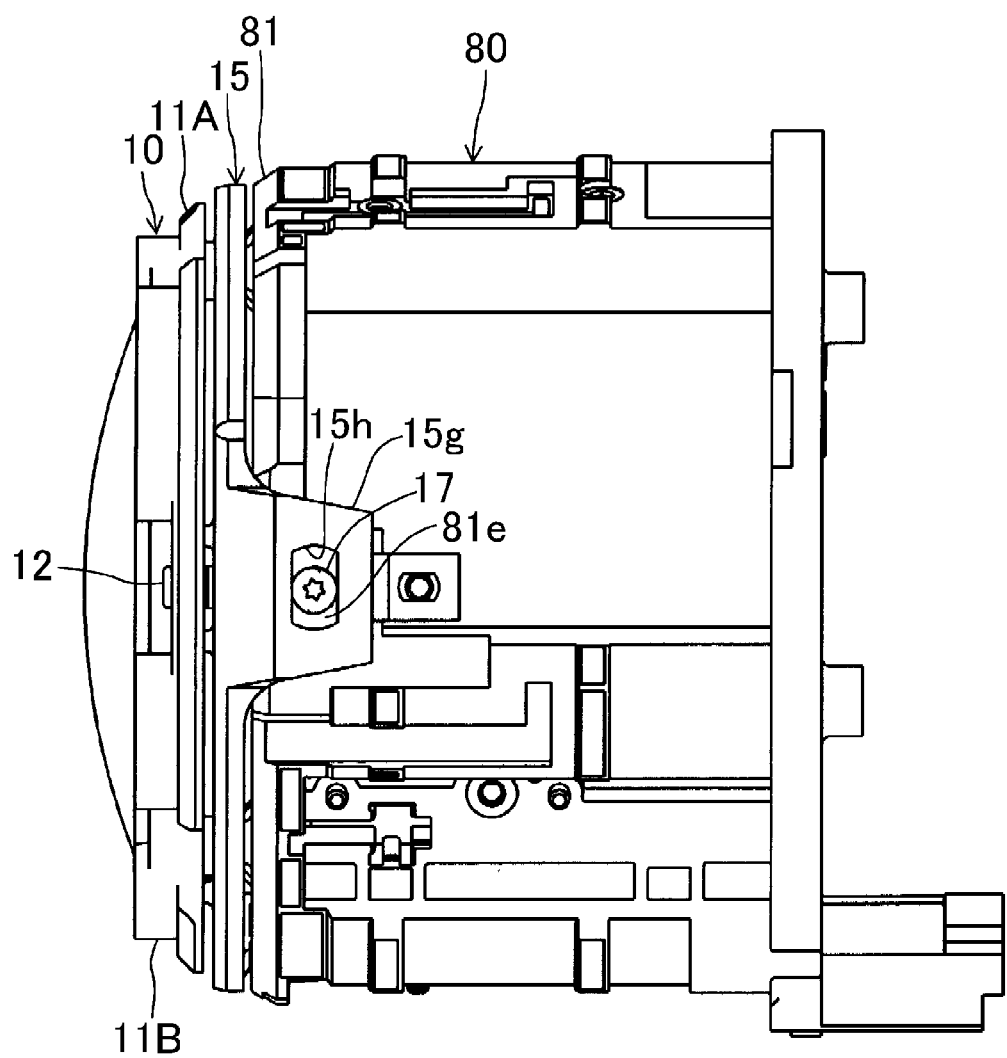
FIG. 11 is a side view of the attachment structure of the first lens group frame to the front fixed frame.

3-1. Detailed Configuration of Attachment Structure of First Lens Group Frame to Front Fixed Frame FIG. 8 is a disassembled perspective view of an attachment structure of the first lens group frame 10 to the front fixed frame 80. FIG. 9 is a perspective view of the attachment structure of the first lens group frame 10 to the front fixed frame 80. FIG. 10 is a front view of the attachment structure of the first lens group frame 10 to the front fixed frame 80. FIG. 11 is a side view of the attachment structure of the first lens group frame 10 to the front fixed frame 80.

As illustrated in FIG. 8, the first lens group frame 10 is attached to the adjusting base 15 with fixing screws 12 such that the first lens group frame 10 is detachable. The adjusting base 15 is attached to the front fixed frame 80 with a fixing screw 16 and first group adjusting pins 17. The tilt angle of the adjusting base 15 relative to the front fixed frame 80 is adjustable by using the first group adjusting pins 17. The "tilt angle" herein refers to the "tilt angle" of the adjusting base 15 relative to the optical axis AX.

The first lens group frame 10 includes a cylindrical body 11A and a flange 11B radially projecting outward from the body 11A. The flange 11B has three first through holes 11a penetrating the flange 11B along the optical axis. The first through holes 11a are circumferentially arranged at different intervals. As illustrated in FIGS. 8-10, second through holes 11b (corresponding to part of positioning portions) penetrating the flange 11B along the optical axis are disposed at both circumferential sides of each of the first through holes 11a in the flange 11B. Since the first through holes 11a are circumferentially arranged at different intervals, the three pairs of the second through holes 11b disposed at both circumferential sides of each of the first through holes 11a are circumferentially arranged at different intervals. One of each pair of the second through holes 11b is a slot, and the other is a circular hole. As illustrated in FIGS. 8 and 10, a first notch 11c (an opening) penetrating the flange 11B along the optical axis is formed in the flange 11B near a circumferential side of one of the first through holes 11a. A second notch 11d penetrating the flange 11B along the optical axis is formed between each adjacent ones of the first through holes 11a in the flange 11B. The second notches 11d are circumferentially arranged at the same interval.

As illustrated in FIG. 8, first through holes 15a penetrating the adjusting base 15 along the optical axis are formed in the adjusting base 15 at locations corresponding to the first through holes 11a in the flange 11B. An edge of each of the first through holes 15a slightly projects forward from the front surface of the adjusting base 15. As illustrated in FIGS. 8 and 10, protrusions 15b (corresponding to part of positioning portions) projecting forward are formed on the adjusting base 15 at locations corresponding to the second through holes 11b in the flange 11B. Since the three pairs of the second through holes 11b are circumferentially arranged at different intervals, the three pairs of the protrusions 15b corresponding to the three pairs of the second through holes 11b are also circumferentially arranged at different intervals. A portion of the adjusting base 15 corresponding to the first notch 11c of the flange 11B forms a thin portion 15c whose surface is recessed relative to the other portion. The thin portion 15c is thinner than the other portion, and thus, has a low rigidity and is deformable. As illustrated in FIG. 8, the thin portion 15c has a second through hole 15d penetrating the thin portion 15c along the optical axis. The edge of the second through hole 15d slightly projects from the front surface of the thin portion 15c. As illustrated in FIGS. 8-10, a third through hole 15e penetrating the thin portion 15c along the optical axis is formed at a circumferential side of the second through hole 15d in the thin portion 15c. Fourth through holes 15f penetrating the adjusting base 15 along the optical axis are formed at locations corresponding to the second notches 11d of the flange 11B. As illustrated in FIGS. 8-11, two attachment tabs 15g (attachment portions) projecting rearward are formed on the outer circumference of the adjusting base 15. The attachment tabs 15g and the thin portion 15c are circumferentially arranged at the same intervals. As illustrated in FIGS. 8, 9, and 11, each of the attachment tabs 15g has a slot 15h extending circumferentially and penetrating the attachment tab 15g radially.

As illustrated in FIG. 8, recesses 81a that are open to the front are formed in the front surface of the front wall 81 of the front fixed frame 80 at locations corresponding to the first through holes 15a of the adjusting base 15. A fixing hole 81b that is open to the front is formed in the front surface of the front wall 81 at a location corresponding to the second through hole 15d of the adjusting base 15. The edge of the fixing hole 81b slightly projects forward from the front surface of the front wall 81. As illustrated in FIGS. 8 and 10, a first protrusion 81c projecting forward is formed on the front surface of the front wall 81 at a location corresponding to the third through hole 15e of the adjusting base 15. Second protrusions 81d projecting forward are formed on the front surface of the front wall 81 at locations corresponding to the fourth through holes 15f of the adjusting base 15. As illustrated in FIGS. 8, 9, and 11, a mount base 81e on which the attachment tab 15g is mounted is formed on the outer circumference of the front wall 81 at a location corresponding to each of the attachment tabs 15g of the adjusting base 15. As illustrated in FIG. 8, a circular hole 81f that is open radially outward is formed in the outer surface of each of the mount bases 81e at a location corresponding to the slot 15h.

The first lens group frame 10 is fixed and attached to the adjusting base 15 with fixing screws 12 inserted in the first through holes 11a of the first lens group frame 10 and the first through holes 15a of the adjusting base 15. At this time, the first lens group frame 10 is positioned relative to the adjusting base 15 by fitting the protrusions 15b of the adjusting base 15 into the second through holes 11b of the first lens group frame 10.

The adjusting base 15 is attached to the front wall 81 with the fixing screw 16 inserted into the second through hole 15d of the adjusting base 15 and the fixing hole 81b of the front wall 81 of the front fixed frame 80 and with the first group adjusting pins (eccentric pins) 17 inserted into the slots 15h of the attachment tabs 15g of the adjusting base 15 and the circular holes 81f of the mount bases 81e of the front wall 81. At this time, the adjusting base 15 is positioned relative to the front wall 81 by fitting the first protrusion 81c of the front wall 81 into the third through hole 15e of the adjusting base 15 and the second protrusions 81d of the front wall 81 into the fourth through holes 15f of the adjusting base 15.

Each of the first group adjusting pin 17 includes a first shaft 17a and a second shaft 17b eccentrically provided in the first shaft 17a. The first shaft 17a is designed to be engaged with the slot 15h of the attachment tab 15g of the adjusting base 15 such that the first shaft 17a is rotatable. The second shaft 17b is designed to be engaged with the circular hole 81f of the mount base 81e of the front wall 81 such that the second shaft 17b is rotatable.

In the manner described above, the first lens group frame 10 is attached to the front wall 81 of the front fixed frame 80 through the adjusting base 15.

3-2. Attachment and Detachment of First Lens Group Frame to/from Front Fixed Frame Attachment of the first lens group frame 10 to the front fixed frame 80 through the adjusting base 15 will now be described.

It will now be described how the first lens group frame 10 is attached to the adjusting base 15.

First, the flange 11B of the first lens group frame 10 is placed to overlap the adjusting base 15, and the body 11A of the first lens group frame 10 is fitted into the center opening of the adjusting base 15.

Next, the protrusions 15b of the adjusting base 15 are inserted into the second through holes 11b of the first lens group frame 10, thereby positioning the first lens group frame 10 relative to the adjusting base 15. Thereafter, the fixing screws 12 are inserted into the first through holes 11a of the first lens group frame 10, and fixed to the first through holes 15a of the adjusting base 15, thereby screwing the first lens group frame 10 to the adjusting base 15.

Then, it will be described how the adjusting base 15 equipped with the first lens group frame 10 is attached to the front fixed frame 80.

First, the adjusting base 15 is placed to overlap the front wall 81 of the front fixed frame 80, and the attachment tabs 15g of the adjusting base 15 are placed to overlap the mount bases 81e of the front wall 81. At this time, the first protrusion 81c of the front wall 81 is inserted into the third through hole 15e of the adjusting base 15, and the second protrusions 81d of the front wall 81 are inserted into the fourth through holes 15f of the adjusting base 15, thereby positioning the adjusting base 15 relative to the front wall 81.

Next, the fixing screw 16 is inserted into the second through hole 15d of the adjusting base 15, and screwed to the fixing hole 81b of the front wall 81. Thereafter, the first group adjusting pins 17 are fitted into the slots 15h of the attachment tabs 15g and the circular holes 81f of the mount bases 81e. In this manner, the adjusting base 15 is screwed to the front wall 81.

In this state, the first group adjusting pins 17 are rotated, thereby adjusting the tilt angle of the first lens group G1 to the optical axis AX. That is, the position of the thin portion 15c of the adjusting base 15 relative to the front fixed frame 80 in the optical axis direction is fixed. On the other hand, since the first and second shafts 17a and 17b of each of the first group adjusting pins 17 are eccentric to each other, rotation of the first group adjusting pin 17 about the second shaft 17b causes the first shaft 17a to press the edge of the slot 15h along the optical axis. In this manner, the position in the optical axis direction of the attachment tabs 15g of the adjusting base 15 relative to the front fixed frame 80 can be adjusted. At this time, the thin portion 15c is slightly deformed. Thus, it is possible to reduce deformation of portions of the adjusting base 15 except the thin portion 15c. In this manner, the tilt angle of the adjusting base 15 relative to the front fixed frame 80 on the optical axis AX can be adjusted. Accordingly, the tilt angle of the first lens group G1 relative to the optical axis AX can be adjusted.

Lastly, the first group adjusting pins 17 are bonded and fixed to the slots 15h and the circular holes 81f.

In the manner described above, the first lens group frame 10 is attached to the front fixed frame 80 through the adjusting base 15.

Figure 12:
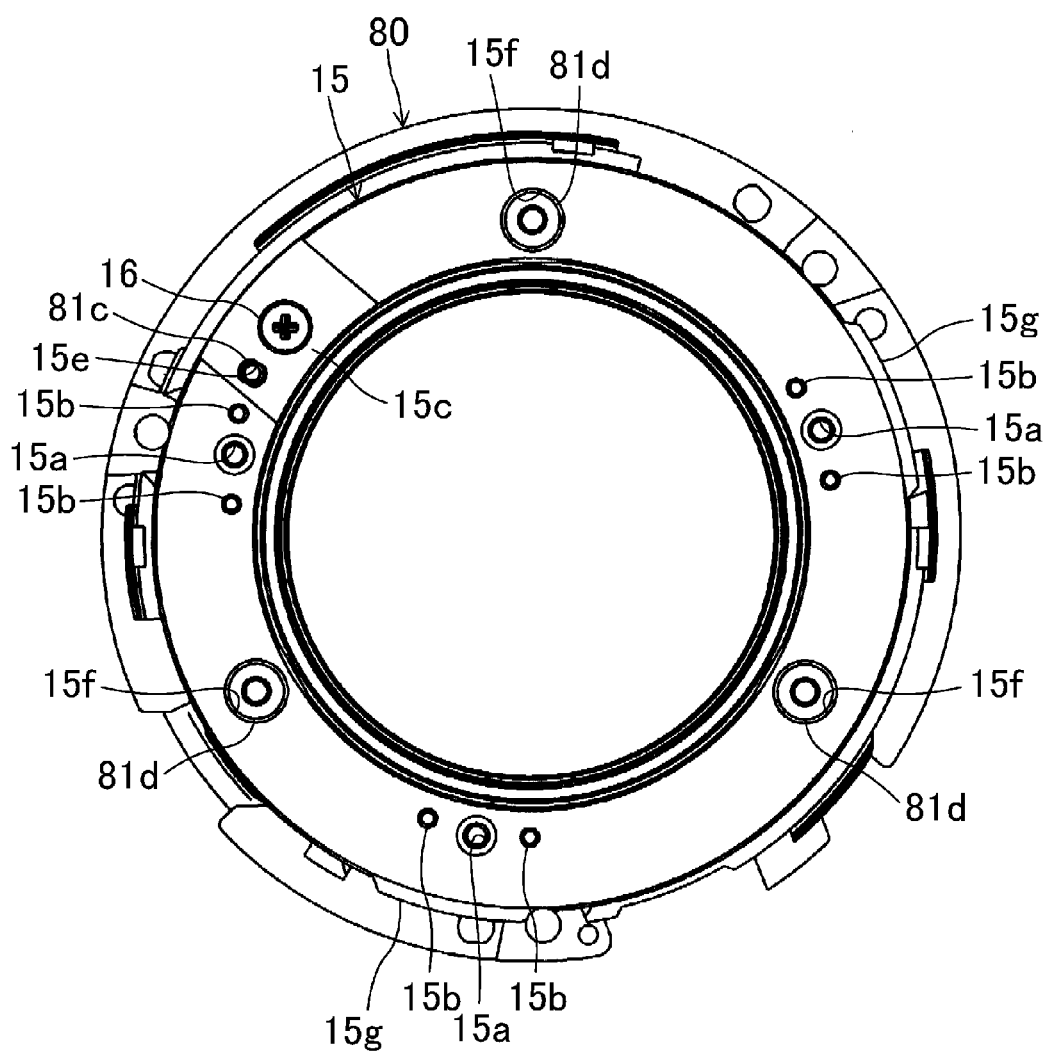
FIG. 12 is a view in which the first lens group frame is detached and which corresponds to FIG. 10.

FIG. 12 is a view in which the first lens group frame 10 is detached and which corresponds to FIG. 10.

To detach the first lens group frame 10 from the front fixed frame 80, the first lens group frame 10 is detached from the front fixed frame 80 by removing the fixing screws 12. At this time, fixture of the adjusting base 15 to the front fixed frame 80 is maintained.

To attach the first lens group frame 10 that has been detached from the front fixed frame 80 to the front fixed frame 80 again, the first lens group frame 10 is fixed to the adjusting base 15 fixed to the front fixed frame 80 in the manner described above. Thus, after detachment of the first lens group frame 10, the tilt angle of the adjusting base 15 relative to the front fixed frame 80 does not need to be adjusted.

4. Detailed Arrangement of Flexible Printed Circuit Board of Zoom Motor

Figure 13:
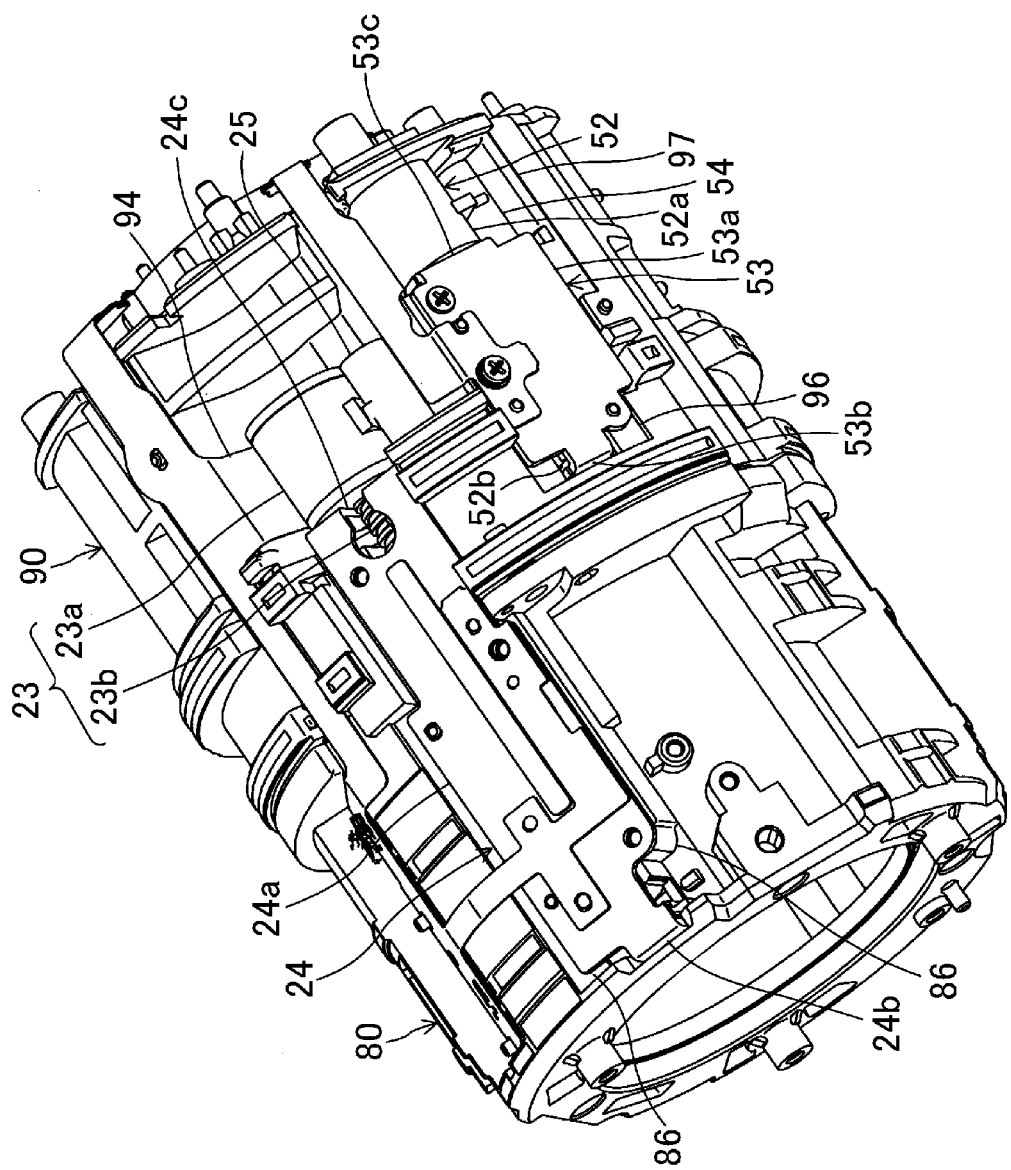
FIG. 13 is a perspective view illustrating arrangement of flexible printed circuits board of a zoom motor and a first focus motor.
Figure 14:
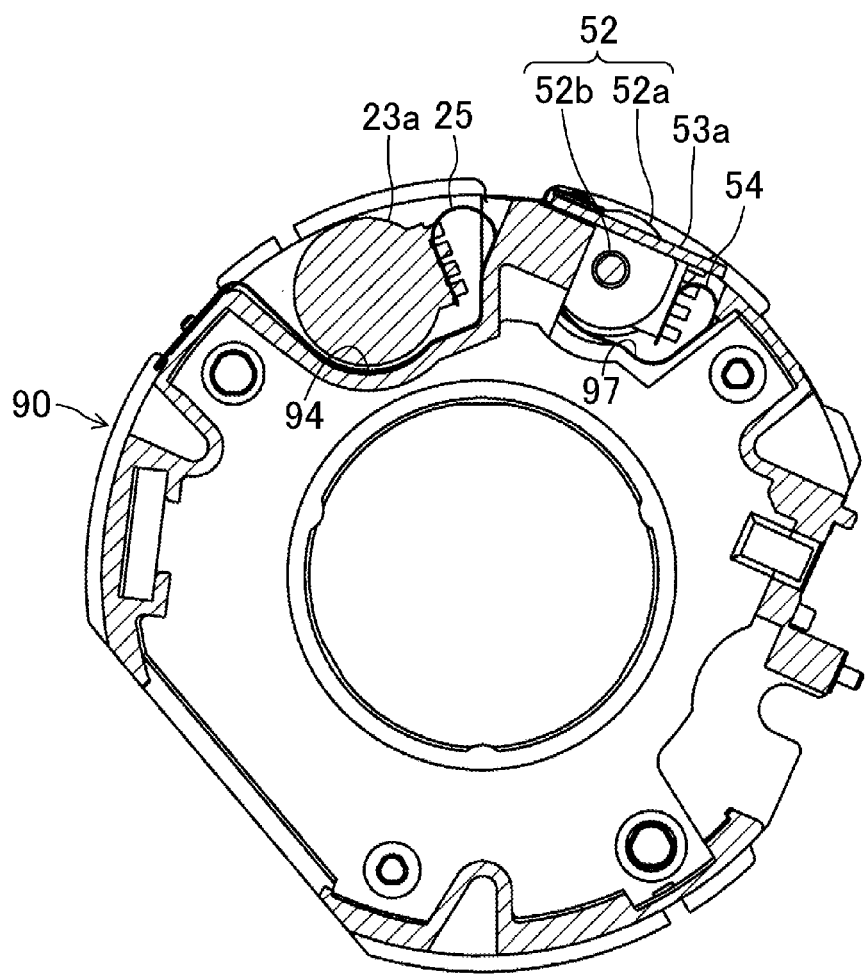
FIG. 14 is a cross-sectional view illustrating arrangement of the flexible printed circuit boards of the zoom motor and the first focus motor.
Figure 15:
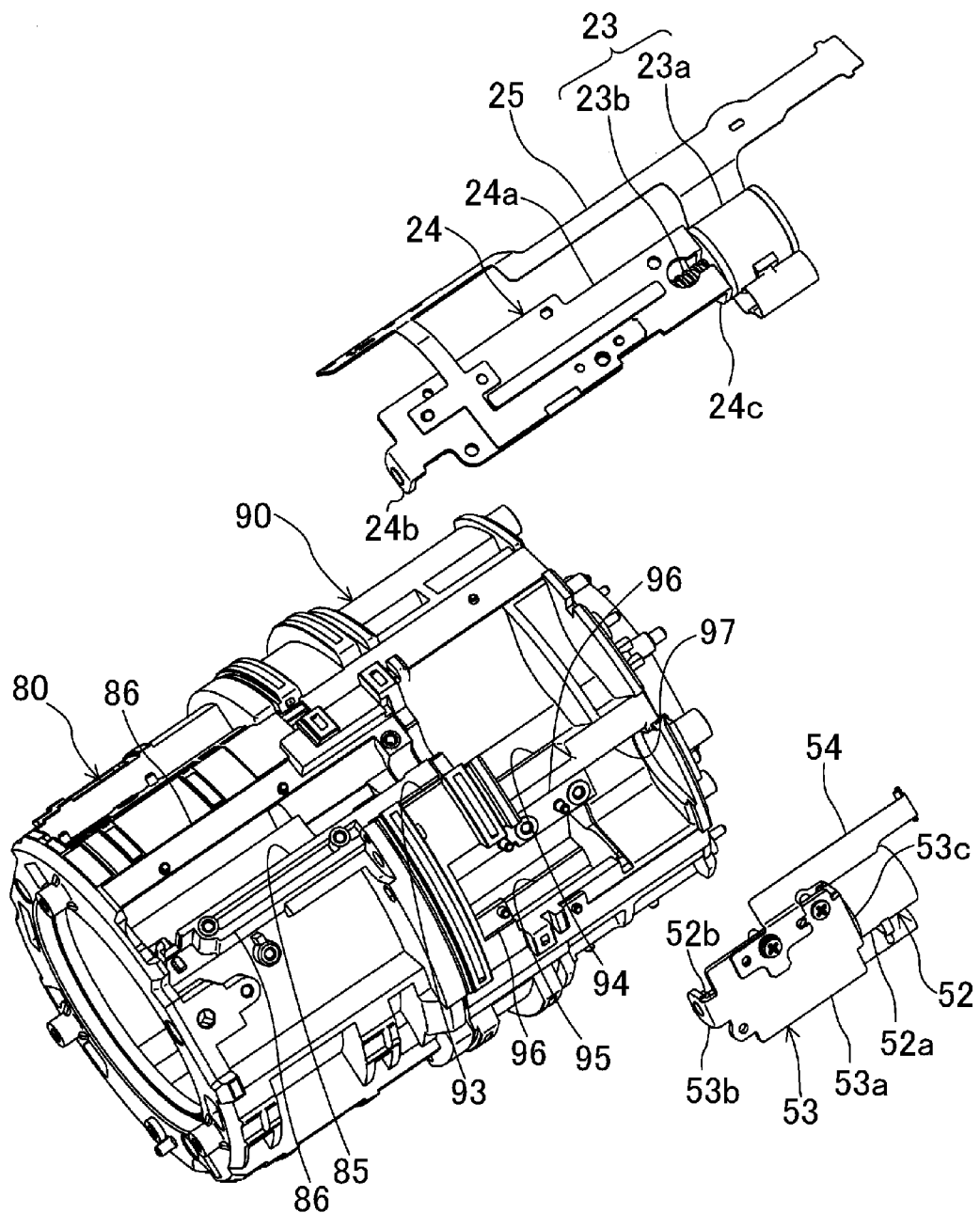
FIG. 15 is a disassembled perspective view illustrating arrangement of the flexible printed circuit boards of the zoom motor and the first focus motor.

FIG. 13 is a perspective view illustrating arrangement of the flexible printed circuit board 25 of the zoom motor 23. FIG. 14 is a cross-sectional view illustrating arrangement of the flexible printed circuit board 25 of the zoom motor 23. FIG. 15 is a disassembled perspective view illustrating arrangement of the flexible printed circuit board 25 of the zoom motor 23.

As illustrated in FIGS. 13-15, the zoom motor 23 includes a motor body 23a and an output screw 23b. As illustrated in FIGS. 13 and 15, the zoom motor 23 is attached to the front fixed frame 80 through an attachment plate 24. The attachment plate 24 includes a plate body 24a extending along the optical axis, a front plate 24b extending radially inward from the front end of the plate body 24a, and a rear plate 24c extending radially inward from the rear end of the plate body 24a. The front plate 24b supports the tip of the output screw 23b such that the output screw 23b is rotatable. The front surface of the motor body 23a is attached to the rear plate 24c.

As illustrated in FIG. 15, a screw housing recess 85 that extends along the optical axis and is open radially outward is formed in the outer circumference of the front fixed frame 80. As illustrated in FIGS. 13 and 15, mount bases 86 extending along the optical axis are formed at both circumferential side rims of the screw housing recess 85 on the outer circumference of the front fixed frame 80. The screw housing recess 85 and the mount bases 86 project rearward from the rear end of the front fixed frame 80. The plate body 24a is attached to the mount bases 86 with the output screw 23b being housed in the screw housing recess 85.

As illustrated in FIG. 15, an engagement hole 93 with which a projection of the mount bases 86 is engaged is formed in the front end of the outer circumference of the rear fixed frame 90 at a location corresponding to the screw housing recess 85 and the projection of the mount bases 86. As illustrated in FIGS. 13-15, a body housing recess 94 that is open radially outward and houses the motor body 23a is formed in the outer circumference of the rear fixed frame 90 near the rear of the engagement hole 93. A wall between the body housing recess 94 and the screw housing recess 85 has a housing hole that houses a proximal end of the output screw 23b.

One circumferential end of the outer circumference of the motor body 23a is connected to the flexible printed circuit board 25. The flexible printed circuit board 25 turns radially inward from the connection point with the motor body 23a, extends to the other circumferential end through a gap between the outer circumference of the motor body 23a and the inner circumference of the body housing recess 94, reaches the edge of the other circumferential end of the body housing recess 94, and then extends toward both sides in the optical axis direction therefrom. The forward extending portion is attached to the outer circumference of the front fixed frame 80 and the outer surface of the plate body 24a. The rearward extending portion is attached to the outer circumference of the rear fixed frame 90. The rear end of the rearward extending portion is connected to the printed circuit board 100 (see, for example, FIG. 4).

In this manner, arrangement of the flexible printed circuit board 25 of the zoom motor 23 is obtained.

5. Detailed Arrangement of Flexible Printed Circuit Board of First Focus Motor FIG. 13 is a perspective view illustrating arrangement of the flexible printed circuit board 54 of the first focus motor 52. FIG. 14 is a cross-sectional view illustrating arrangement of the flexible printed circuit board 54 of the first focus motor 52. FIG. 15 is a disassembled perspective view illustrating arrangement of the flexible printed circuit board 54 of the first focus motor 52.

As illustrated in FIGS. 13-15, the first focus motor 52 includes a motor body 52a and an output screw 52b. The first focus motor 52 is attached to the rear fixed frame 90 through an attachment plate 53. The attachment plate 53 includes a plate body 53a extending along the optical axis, a front plate 53b extending radially inward from the front end of the plate body 53a, and a rear plate 53b extending radially inward from the rear end of the plate body 53a. The front plate 53b supports the tip of the output screw 52b such that the output screw 52b is rotatable. The front surface of the motor body 52a is attached to the rear plate 53b.

As illustrated in FIG. 15, a screw housing recess 95 that extends along the optical axis and is open radially outward is formed in the outer circumference of the rear fixed frame 90 near one circumferential side of the body housing recess 94. As illustrated in FIGS. 13 and 15, mount bases 96 extending along the optical axis are formed at both circumferential side edges of the screw housing recess 95 on the outer circumference of the rear fixed frame 90. The plate body 53a is attached to the mount bases 96 with the output screw 52b being housed in the screw housing recess 95. A body housing recess 97 that is open radially outward and houses the motor body 52a is formed in the outer circumference of the rear fixed frame 90 near the rear of the screw housing recess 95.

As illustrated in FIGS. 13-15, one circumferential end of the outer circumference of the motor body 52a is connected to the flexible printed circuit board 54. The flexible printed circuit board 54 turns radially inward from the connection point with the motor body 52a, extends to the other circumferential end through a gap between the outer circumference of the motor body 52a and the inner circumference of the body housing recess 97, reaches the edge of the other circumferential end of the body housing recess 97, and then extends toward both sides in the optical axis direction therefrom. The forward extending portion is attached to the outer surface of the plate body 53a. The rear end of the rearward extending portion is connected to the printed circuit board 100.

In this manner, arrangement of the flexible printed circuit board 54 of the first focus motor 52 is obtained.

6. Method for Arrangement of Flexible Printed Circuit Boards of Zoom Motor and First Focus Motor Arrangement of the flexible printed circuit boards 25 and 54 of the zoom motor 23 and the first focus motor 52 will now be described.

First, the zoom motor 23 and the flexible printed circuit board 25 are fixed to the attachment plate 24. Next, with the motor body 23a of the zoom motor 23 being housed in the body housing recess 94 of the rear fixed frame 90 and the output screw 23b being housed in the screw housing recess 85 of the front fixed frame 80, the plate body 24a of the attachment plate 24 is fixed to the mount bases 86 of the front fixed frame 80, and the flexible printed circuit board 25 is fixed to the front fixed frame 80 and the outer circumference of the rear fixed frame 90.

In addition, the first focus motor 52 and the flexible printed circuit board 54 are fixed to the attachment plate 53. Then, with the motor body 52a of the first focus motor 52 being housed in the body housing recess 97 of the rear fixed frame 90 and the output screw 52b being housed in the screw housing recess 95, the plate body 53a of the attachment plate 53 is fixed to the mount bases 96.

Lastly, the outer frame 160 is attached to the rear fixed frame 90.

7. Summary of Embodiment

The lens barrel 3 of this embodiment includes the first lens group frame 10 holding the first lens group G1 having the first through third lenses L1-L3, the adjusting base 15 to which the first lens group frame 10 is detachably attached, and the front fixed frame 80 to which the adjusting base 15 is attached. In the lens barrel 3, the tilt angle of the adjusting base 15 relative to the front fixed frame 80 can be adjusted.

With this configuration, since the first lens group frame 10 is detachably attached to the adjusting base 15, even when the tilt angle of the first lens group G1 is adjusted by adjusting the tilt angle of the adjusting base 15 relative to the adjustment front fixed frame 80 and then the lens barrel 3 is disassembled/assembled by detaching/attaching the first lens group frame 10, the tilt angle of the lens can be maintained. Thus, maintenance such as dust removal can be easily performed.

The first lens group frame 10 holds the first lens group G1 having the first lens L1 closest to a subject among the lenses L1-L14.

Dust between the first lens group G1 and the second lens group G2 is most conspicuous among the dust in the lens barrel 3.

In view of this, in this embodiment, the first lens group frame 10 is detachably attached to the adjusting base 15, and thus, the most conspicuous dust between the first lens group G1 and the second lens group G2 can be easily removed.

The first lens group frame 10 is positioned relative to the adjusting base 15.

With this configuration, the first lens group frame 10 can be attached to the adjusting base 15 at a predetermined position with a predetermined tilt angle.

The second through holes 11b penetrating the first lens group frame 10 along the optical axis are formed at both circumferential sides of each of the first through holes 11a of the first lens group frame 10. The forward protrusions 15b are formed at locations corresponding to the second through holes 11b of the adjusting base 15. The three pairs of the second through holes 11b and the three pairs of the protrusions 15b are circumferentially arranged at different intervals. The first lens group frame 10 is positioned relative to the adjusting base 15 by fitting the protrusions 15b into the second through holes 11b.

With this configuration, the protrusions 15b can be fitted into the second through holes 11b only when the first lens group frame 10 is correctly positioned relative to the adjusting base 15. Thus, this configuration ensures attachment of the first lens group frame 10 to the adjusting base 15 at a predetermined position with a predetermined tilt angle.

The tilt angle of the adjusting base 15 relative to the front fixed frame 80 is adjustable with the first lens group frame 10 being attached to the adjusting base 15.

With this configuration, the tilt angle of the adjusting base 15 relative to the front fixed frame 80 can be adjusted with the first lens group frame 10 being attached to the adjusting base 15.

In addition, the first lens group frame 10 has the first notch 11c penetrating the first lens group frame 10 along the optical axis. The adjusting base 15 is partially attached to the front fixed frame 80 with the axial position being fixed, in the thin portion 15c corresponding to the first notch 11c.

With this configuration, since the adjusting base 15 is partially attached and fixed to the front fixed frame 80 in the thin portion 15c corresponding to the first notch 11c penetrating the first lens group frame 10 along the optical axis, the first lens group frame 10 does not hinder attachment and fixing of the thin portion 15c of the adjusting base 15 to the front fixed frame 80 with the first lens group frame 10 being attached to the adjusting base 15.

In addition, the attachment tabs 15g projecting toward the front fixed frame 80 are formed on the outer circumference of the adjusting base 15. The attachment tabs 15g are attached to the mount bases 81e on the outer circumference of the front fixed frame 80 such that the position in the optical axis direction can be adjusted. By adjusting the position of the attachment tabs 15g relative to the front fixed frame 80 in the optical axis direction, the tilt angle of the adjusting base 15 relative to the front fixed frame 80 can be adjusted.

In this configuration, the attachment tabs 15g projecting toward the front fixed frame 80 on the outer circumference of the adjusting base 15 are attached to the mount bases 81e on the outer circumference of the front fixed frame 80 such that the position of the adjusting base 15 in the optical axis direction can be adjusted. Thus, the first lens group frame 10 is less likely to hinder attachment of the attachment tabs 15g of the adjusting base 15 to the mount bases 81e of the front fixed frame 80 or adjustment of the position of the attachment tabs 15g of the adjusting base 15 relative to the front fixed frame 80 in the optical axis direction with the first lens group frame 10 being attached to the adjusting base 15. In addition, adjustment of the position in the optical axis direction of the attachment tabs 15g of the adjusting base 15 relative to the front fixed frame 80 allows the tilt angle of the adjusting base 15 relative to the front fixed frame 80 to be adjusted. Furthermore, since the attachment tabs 15g and the mount bases 81e are located on the outer circumferences of the adjusting base 15 and the front fixed frame 80, respectively, the total length of the lens barrel 3 can be smaller than that in a case (which will be described in detail later) where a spring member is disposed between the adjusting base 15 and the front fixed frame 80 in order to adjust the tilt angle of the adjusting base 15 relative to the front fixed frame 80.

The thin portion 15c of the adjusting base 15 is thinner and has a lower rigidity, than the other portion, and thus, is deformable.

In this configuration, the thin portion 15c is deformed when the position in the optical axis direction of the attachment tabs 15g of the adjusting base 15 relative to the front fixed frame 80 is adjusted. Thus, deformation of the other portion except the thin portion 15c in the adjusting base 15 can be reduced, thereby ensuring adjustment of the tilt angle of the adjusting base 15 relative to the front fixed frame 80.

The lens barrel 3 of this embodiment includes the cylindrical outer frame 160, the rear fixed frame 90 fitted into the inner circumference of the outer frame 160, the zoom motor 23 and the first focus motor 52 facing the outer frame 160 and located on the outer circumference of the rear fixed frame 90, the flexible printed circuit board 25 connected to the zoom motor 23, and the flexible printed circuit board 54 connected to the first focus motor 52. The flexible printed circuit board 25 is located between the outer circumference of the rear fixed frame 90 (i.e., the inner circumference of the body housing recess 94) and the motor body 23a of the zoom motor 23. The flexible printed circuit board 54 is located between the outer circumference of the rear fixed frame 90 (i.e., inner circumference of the body housing recess 97) and the motor body 52a of the first focus motor 52.

In this configuration, since the flexible printed circuit boards 25 and 54 are located between the outer circumference of the rear fixed frame 90 and the motor bodies 23a and 52a of the motors 23 and 52, convenience in attachment of the outer frame 160 to the rear fixed frame 90 can be enhanced, as compared to a case where the flexible printed circuit boards 25 and 54 are located between the outer frame 160 and the motor bodies 23a and 52a of the motors 23 and 52.

OTHER EMBODIMENTS

As described above, the above embodiment has been described as an example technique disclosed in the present application. However, the techniques according to the present disclosure are not limited to this embodiment, but are also applicable to those where modifications, substitutions, additions, and omissions are made. In addition, elements described in the above embodiment may be combined to provide a different embodiment.

Specifically, the above embodiment may have the following configurations.

In the above embodiment, the attachment structure of the first lens group frame 10 to the front fixed frame 80 is applied to a digital camera with interchangeable lenses. However, the present disclosure is not limited to cameras of this type, and is also applicable to integrated lens cameras.

In the above embodiment, the attachment structure of the first lens group frame 10 to the front fixed frame 80 is applied to the lens barrel 3 that is a zoom lens with a fixed overall length. The present disclosure is also applicable to collapsible lens barrels.

In the above embodiment, the attachment structure is applied to the attachment structure of the first lens group frame 10 to the front fixed frame 80. The present disclosure is also applicable to an attachment structure of a lens frame except the first lens group 10 to the fixed frame.

In the above embodiment, the first lens group frame 10 is detachably attached to the adjusting base 15 with the fixing screws 12. Alternatively, the first lens group frame 10 may be detachably attached to the adjusting base 15 with a detachable press-fitting pin or rotation snap fixture, for example.

In the above embodiment, the first lens group frame 10 includes the three lenses L1-L3. Alternatively, the first lens group frame 10 may include one, two, or four or more lenses.

In the above embodiment, the tilt angle of the first lens group G1 relative to the optical axis AX is adjusted by rotating the first group adjusting pins 17 around the second shafts 17b. Alternatively, the following configuration may be employed. Specifically, in another embodiment, with the spring member being disposed between the adjusting base 15 and the front wall 81 of the front fixed frame 80, the adjusting base 15 is attached to the front wall 81 with a fixing screw, and the tilt angle of the first lens group G1 relative to the optical axis AX is adjusted by adjusting the amount of screwing of this fixing screw. However, in view of reduction of the total length of the lens barrel 3 and the number of components, the configuration of the above embodiment is preferable.

In the embodiment, the tilt angle of the first lens group G1 relative to the optical axis AX is adjusted. Alternatively, the position of the first lens group G1 in the direction orthogonal to the optical axis AX or the position of the first lens group G1 in the optical axis direction may be adjusted.

In the above embodiment, the tilt angle of the adjusting base 15 relative to the front fixed frame 80 is adjusted. Alternatively, the position of the adjusting base 15 relative to the front fixed frame 80 may be adjusted. The "position" herein refers to the position of the adjusting base 15 relative to the front fixed frame 80 in the optical axis direction or the direction orthogonal to the optical axis AX. To adjust the position of the adjusting base 15, the fixing screw 16 is preferably replaced by an adjustment means capable of adjusting the position of the adjusting base 15 in the optical axis direction or the direction orthogonal to the optical axis AX.

In the above embodiment, the first lens group frame 10 is positioned relative to the adjusting base 15 by inserting the protrusions 15b of the adjusting base 15 into the second through holes 11b of the first lens group frame 10. Alternatively, for the positioning, the fixing screws 12 may be inserted in the first through holes 11a of the first lens group frame 10 and are screwed to the first through holes 15a of the adjusting base 15. That is, the thus-configured screw portion constitutes the positioning portion.

In the above embodiment, three pairs of each of the second through holes 11b and the protrusions 15b are provided. Alternatively, four or more pairs of each of the second through holes 11b and the protrusions 15b may be provided.

In the above embodiment, the three pairs of the second through holes 11b and the three pairs of the protrusions 15b are arranged at different intervals along the circumferential direction. Alternatively, two adjacent ones of the three pairs of the second through holes 11b (i.e., adjacent ones of the protrusions 15b) are disposed at the same interval, and the other pair of the second through holes 11b is disposed at an interval different from that of the two adjacent pairs of the second through holes 11b.

The lens barrel described above can maintain the position or tilt angle of a lens while the lens barrel is disassembled/assembled after an adjustment of the position or tilt angle of the lens, and thus, is useful in the technical field of, for example, imaging apparatus.

Various embodiments have been described above as example techniques of the present disclosure, in which the attached drawings and the detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A lens barrel comprising:
   a lens frame including at least one lens;
   a lens adjusting frame to which the lens frame is attached; and
   a fixed frame to which the lens adjusting frame is attached, wherein
   the lens adjusting frame is attached to the fixed frame such that a position or a tilt angle of the lens adjusting frame is adjustable,
   the lens frame is attached to the lens adjusting frame such that the lens frame is detachable from the lens adjusting frame,
   the lens adjusting frame has an outer circumference from which an attachment portion protrudes toward the fixed frame, and
   the attachment portion is attached to an outer circumference of the fixed frame such that a position of the attachment portion is adjustable along an optical axis.

2. The lens barrel of claim 1, wherein the lens frame includes a first lens closest to at least a subject.

3. The lens barrel of claim 1, wherein the lens frame is positioned relative to the lens adjusting frame.

4. The lens barrel of claim 3, wherein
   the lens frame is positioned relative to the lens adjusting frame by using at least three positioning portions arranged at intervals along a circumferential direction around an optical axis, and
   at least two pairs of adjacent ones of the positioning portions are disposed at different intervals.

5. The lens barrel of claim 1, wherein
   the position or the tilt angle of the lens adjusting frame relative to the fixed frame is adjustable with the lens frame being attached to the lens adjusting frame.

6. The lens barrel of claim 1, wherein
   the lens frame has an opening penetrating the lens frame along an optical axis, and
   the lens adjusting frame is partially attached to the fixed frame at a location corresponding to the opening.

* * * * *